United States Patent [19]
Nodolf

[11] 3,949,607
[45] Apr. 13, 1976

[54] ENTHALPY CONTROL APPARATUS FOR AIR CONDITIONING

[75] Inventor: Keith M. Nodolf, Bloomington, Minn.

[73] Assignee: Honeywell Inc., Minneapolis, Minn.

[22] Filed: Oct. 3, 1974

[21] Appl. No.: 511,870

[52] U.S. Cl............... 73/336; 200/61.06; 236/44 C; 337/300
[51] Int. Cl.² G01W 1/06; G01W 1/17; G05D 27/02
[58] Field of Search................... 73/336; 200/61.06; 236/44 C; 337/300

[56] References Cited
UNITED STATES PATENTS

| | | |
|---|---|---|
| 2,157,685 | 5/1939 | Anderson........................ 236/44 C |
| 2,974,209 | 3/1961 | McMichael........................ 337/300 |
| 3,288,961 | 11/1966 | Thompson........................ 200/61.06 |

Primary Examiner—James J. Gill
Attorney, Agent, or Firm—Clyde C. Blinn; Henry L. Hanson

[57] ABSTRACT

A control apparatus responding to enthalpy or "total" heat content, temperature and moisture content, of air wherein a moisture responsive element changes in length and is reset by a temperature responsive element to control a switch with means to limit the effect of the moisture responsive element above certain levels of moisture so the switch is controlled only by temperature.

5 Claims, 4 Drawing Figures

ENTHALPY CONTROL APPARATUS FOR AIR CONDITIONING

BACKGROUND AND SUMMARY OF THE INVENTION

Control apparatus having temperature responsive means and humidity responsive means responding to the temperature and moisture content of air for providing an output indicative of the enthalpy or "total" heat content of air have been commercially available for some time. One particular enthalpy control is sold by the applicant's assignee as the H205A enthalpy control and has a moisture responsive element connected between an adjustment member and a switch operator wherein the switch is operated as the moisture responsive element changes in length. A temperature responsive member is attached to the adjusting member to reset the position of the adjusting member in response to the temperature of a bulb. When such a control device is placed in the outdoor air inlet duct or an air conditioning system to be responsive to the temperature and moisture content of the air, the switch is operated in response to the enthalpy of the air. Such a control can be designed so the switch will operate over a predetermined characteristic curve approximating constant enthalpy. If the switch is connected to the damper control apparatus of an air conditioning system, when the enthalpy of the outdoor air is above some predetermined level, the outdoor air dampers can be closed to prevent the outdoor air from being drawn into the air conditioning system.

In such prior art apparatus wherein the temperature responsive apparatus resets the position of the adjusting member for the moisture responsive apparatus, at extremely high moisture levels, such as above 90 per cent relative humidity, the designs result in an operation of the switch at lower enthalpy than desired.

The present invention is concerned with a control apparatus providing an output indicative of a thermodynamic property of moist air of the enthalpy of air wherein the moisture responsive element which is reset by a temperature responsive element has a limit to prevent the control apparatus from being out of control at high moisture levels. Specifically, a mechanical connection is connected between the switch operator and the adjustment means in parallel with the moisture responsive element so that as the moisture responsive element increases in length beyond a predetermined value depending upon the high moisture level, the temperature responsive element is directly connected to the switch operator to control the switch in accordance with the temperature.

OPERATION OF THE INVENTION

Figure 1:
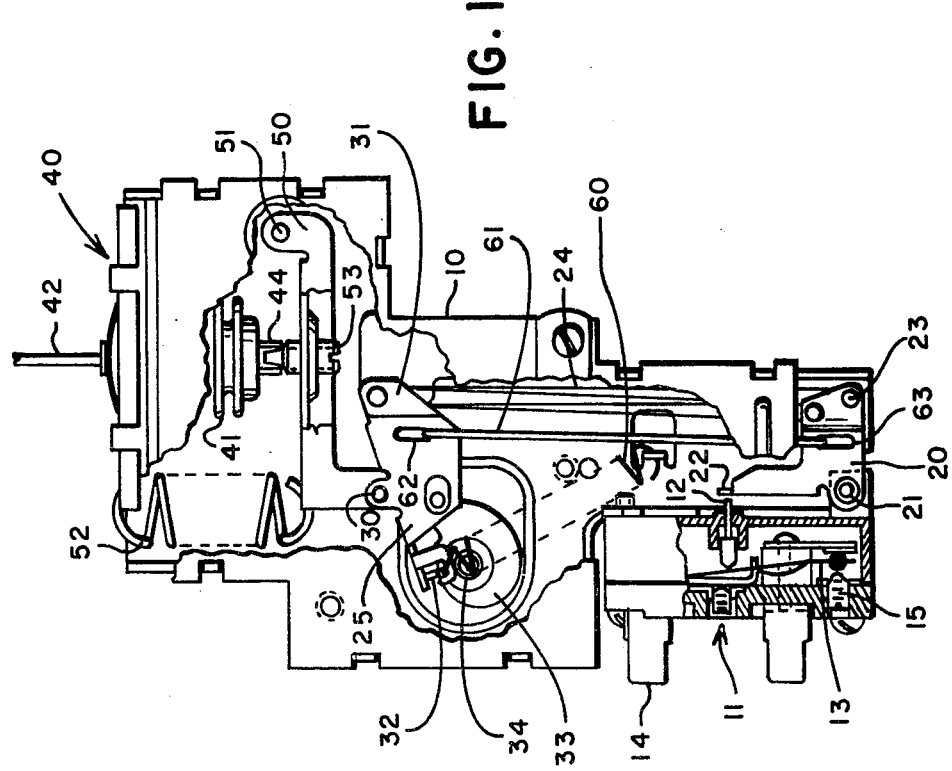
FIG. 1 is a side partial cross sectional view of the control apparatus.

Referring to FIG. 1, a base or frame 10 of the enthalpy control apparatus has mounted at the lower end an output means or switch 11 of a conventional type such as shown in the P. K. McGall U.S. Pat. No. 1,960,020 which issued May 22, 1934. The switch has an input member or plunger 12 which when pushed inward moves a switch member 13 for closing a circuit between terminals 14 and 15 (partially shown). A switch operating lever or output member 20 is pivotally connected to base 10 at 21 to have one extremity 22 engaging switch operating member 12 and a second extremity 23 to which one end of a moisture responsive element 24 is connected. An adjusting member or lever 25 pivotally mounted at 30 has a first extremity 31 connected to the other end of moisture responsive element 24. A second extremity 32 has a cam rider positioned on a cam 33 attached to a manual adjusting shaft 34. The moisture responsive portion of the enthalpy control apparatus is similar to the control of the Maynard L. Thompson U.S. Pat. No. 3,288,961, issued Nov. 29, 1966.

Figure 2:
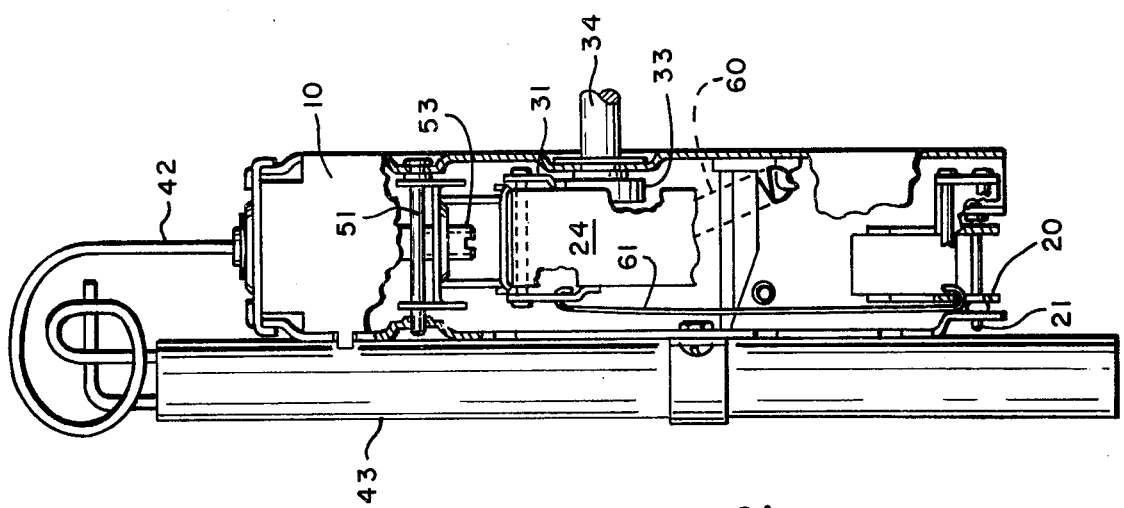
FIG. 2 is an end partial cutaway view of the control apparatus.

A temperature responsive apparatus 40 comprises a conventional bellows 41 connected by a capillary tube 42 to a remote bulb 43 as shown in FIG. 2. Bellows 41 is attached to base 10 and has a lower end 44 engaging a support lever 50. Lever 50 is pivotally mounted at 51 on base 10 and attached at its other extremity to support 30 of the adjusting member 25. As the temperature of bulb 43 increases, bellows 41 expands to move lever 50 counterclockwise about pivot 51, against a bias spring 52 by an amount depending upon the adjustment of the calibration screw 53, to position pivot 30. Depending upon the position of cam rider 32, as selected by the manual adjustment of cam 30, movement of pivot 30 adjusts or resets the upper end of moisture responsive element 24 which is in tension as spring 60 maintains cam rider 32 against the surface of cam 33.

Connected in parallel with moisture responsive element 24 is a mechanical wire connection 61 which is hooked through elongated holes 62 and 63 in the operator 20 and the adjusting member 25. As moisture responsive element reaches some predetermined length obtainable at a 90 per cent relative humidity, wire 61 abuts against the ends of elongated holes 62 and 63 to provide a rigid limiting connection between member 20 and adjusting member 25 so that switch 11 is controlled directly by the temperature responsive mechanism 40. While the construction of the wire 61 and its connection is similar to the Thompson patent disclosure, the operation is for an entirely different purpose.

Figure 3:
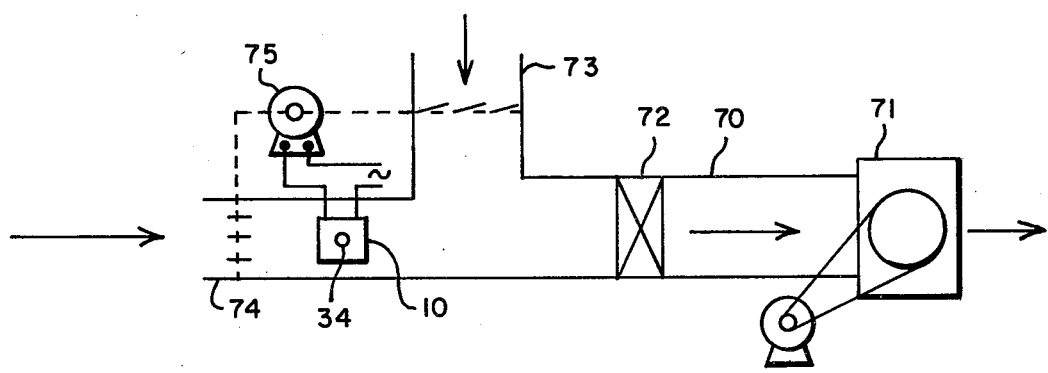
FIG. 3 is a schematic representation of an air conditioning system making use of the control apparatus.

Referring to FIG. 3, a schematic of an air conditioning system in which the present invention is used is shown. A duct 70 delivers air by means of a fan 71 to an air conditioned space of a building. The air might be treated, such as for cooling, by a heat exchanger or coil 72. Return air from the building flows through a return air duct 73 and fresh air from outdoors enters an outdoor duct 74. The amount of fresh air is determined by the position of dampers in ducts 73 and 74, and in this particular application, when switch 11 of enthalpy control apparatus is closed, a motor 75 is energized to open the outdoor air damper and close the return air damper.

Figure 4:
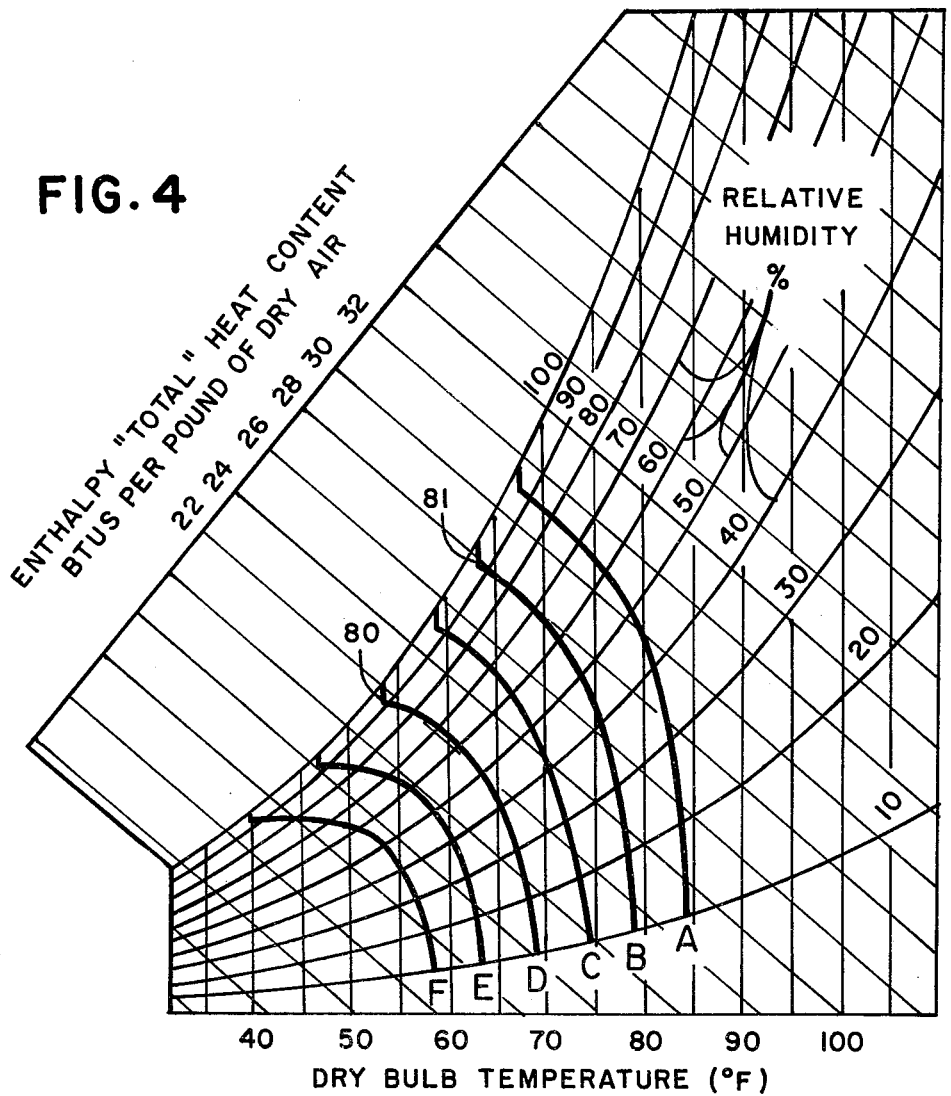
FIG. 4 is a graphical presentation of the enthalpy of air in the form of a psychrometric chart.

Referring to FIG. 4, the psychrometric chart or diagram which discloses the thermodynamic properties of moist air shows the vertical dry bulb temperature, the diagonal enthalpy or "total heat" content of the air in BTU's per pound of dry air and the dotted relative humidity lines.

Theoretically, the enthalpy control apparatus for controlling the use of outdoor air in an air conditioning system is designed to control on an enthalpy line such as 24. When an intersection of the dry bulb temperature and relative humidity lines for the outdoor air is below the enthalpy line the motor is energized to open the outdoor air damper. When the intersection of the dry bulb temperature and relative humidity lines for the outdoor air is above the enthalpy line, the outdoor air would not be used.

The prior art enthalpy control apparatus mentioned in the beginning of the specification is designed to selectively operate on characterized enthalpy lines which are shown as A, B, C, D, E, and F depending upon the position of the manual set point of the control shown in FIGS. 1 and 2. Shaft 34 adjusts cam 33 to select a characterized enthalpy operation which might lie over one of the lines shown. For example if the calibration of the enthalpy control apparatus was set for line D, when the relative humidity and dry bulb temperature lines intersect at a point to the left of line D, the switch is closed and the motor opens the outdoor air damper and closes the return air damper to make use of the outdoor air for maximum economy. As the relative humidity and dry bulb temperature intersection moved to the right of line D, the outdoor air damper is closed. The prior art device was found to be difficult to characterize in the high humidity range, above 90 per cent, and as a result the characterized enthalpy curve D bends to the left in a downward manner. A certain range of dry bulb and relative humidity intersection area which was still usable would lie above the characterized curve.

By use of wire 61, as shown in FIG. 1, in the enthalpy control apparatus, the connection between switch operating member 20 and adjustment member 25 was made rigid at humidities above 95 per cent. The characterized enthalpy control line deviated from the combination of relative humidity as measured by member 24 and the temperature as measured by bulb 43 to only a temperature responsive control to extend the characterized enthalpy line or curve such as D along a constant temperature line 80 as shown in FIG. 4.

While the operation is described with the characteristic as shown by line D, obviously for other calibrations determined by the position of shaft 34 of the control, if the enthalpy control was operating along a characterized enthalpy line such as B, the area at which the relative humidity member 24 becomes inactive due to the solid connection by wire 61 is shown by the portion 81 also being a constant temperature line. Specifically, as the humidity increases and element 24 becomes longer, the distance between extremity 23 and extremity 31 is limited as wire 61 engages the ends of holes 62 and 63. Movement of switch lever 20 is then only accomplished by the output of bellows 41.

With the use of the member 61 to render the relative humidity sensor 24 inactive, the characterized enthalpy line is made to deviate from the curving characterized line to include the portion extending upward as shown in FIG. 4 at which time only temperature is used to control the operation of the switch. With such an improvement, an area of control of the outdoor dampers to provide for the use of outdoor air is extended.

The embodiments of the invention in which an exclusive property or right is claimed are defined as follows:

1. An improvement in control apparatus having humidity responsive means responsive to the humidity of air for controlling an output means and temperature responsive means responsive to the temperature of air connected to override the humidity responsive means to change the output means to provide an output indicative of a thermodynamic property of the air, the improvement comprising
    means connected to said humidity responsive means for rendering said humidity responsive means inoperative at high humidity levels so that at high humidity levels said output means provides an output indicative of only temperature.

2. In control apparatus responsive to moisture and temperature conditions of air for providing an output indicative of a thermodynamic property of the air comprising,
    a base,
    output means connected to said base,
    adjustment means connected to said base,
    moisture responsive means responsive to the moisture of air and connected between said output means and said adjustment means,
    temperature responsive means responsive to the temperature of air and connected to said adjustment means for changing the effects of said moisture responsive means on said output means in response to temperature, and
    limiting means for limiting the effect of said moisture responsive means on said output means so that at high moisture levels said output is responsive to only the temperature of the air.

3. The invention of claim 2 wherein
    said moisture responsive means comprises a flexible element which changes in length as the moisture of the surrounding air changes
    said limiting means comprises a wire loosely attached to said adjustment means and said output means to limit the length of said element whereby at high moisture levels when said element exceeds a predetermined length, said moisture responsive means has no effect and said output means is controlled by said temperature responsive means.

4. The invention of claim 3 wherein
    said adjustment means has a manual input for setting the control point of said apparatus to select a particular enthalpy for controlling said output means.

5. In an enthalpy control apparatus comprising,
    a base member,
    output means connected to said base member,
    adjustment means connected to said base member,
    moisture responsive means connected between said output means and said adjustment means, said moisture responsive means changes in length as the moisture in the surrounding air increases to operate said output means,
    temperature responsive means connected to said adjustment means for resetting the effect of said moisture responsive means on said output means, and
    limiting means for limiting the effect of said moisture responsive means whereby upon said moisture responsive means reaching a high moisture level said temperature responsive means has control of said output means.

* * * * *